United States Patent
Thornton (10) Patent No.: US 12,031,618 B2
(45) Date of Patent: Jul. 9, 2024

(54) RELUCTOR GEAR ASSEMBLY

(71) Applicant: Super ATV, LLC, Madison, IN (US)

(72) Inventor: Ken Thornton, Canaan, IN (US)

(73) Assignee: Super ATV, LLC, Madison, IN (US)

( * ) Notice: Subject to any disclaimer, the term of this patent is extended or adjusted under 35 U.S.C. 154(b) by 10 days.

(21) Appl. No.: 18/048,050

(22) Filed: Oct. 20, 2022

(65) Prior Publication Data

US 2024/0133455 A1 Apr. 25, 2024

(51) Int. Cl.
*F16H 55/10* (2006.01)
*F16H 55/17* (2006.01)
*F16H 57/00* (2012.01)

(52) U.S. Cl.
CPC ..... *F16H 55/17* (2013.01); *F16H 2057/0075* (2013.01)

(58) Field of Classification Search
CPC .. F16H 55/17; F16H 2057/0075; F16H 55/12; F16H 2001/323; F16H 3/00; F16H 3/04; F16H 2061/085; F16H 2306/20; F16H 61/08
See application file for complete search history.

(56) References Cited

U.S. PATENT DOCUMENTS

| | | | |
|---|---|---|---|
| 11,578,792 B2 * | 2/2023 | Lebang | F16H 55/0873 |
| 2020/0217256 A1 * | 7/2020 | Hokuto | F16K 31/047 |
| 2020/0217410 A1 * | 7/2020 | Yamaguchi | F16H 55/17 |
| 2020/0240504 A1 * | 7/2020 | Lebang | B23F 19/10 |
| 2022/0186816 A1 * | 6/2022 | Billmeyer | F16H 1/321 |

FOREIGN PATENT DOCUMENTS

| | | | | |
|---|---|---|---|---|
| CN | 111750068 A | * | 10/2020 | F02B 61/06 |
| WO | WO-2020054845 A1 | * | 3/2020 | |

* cited by examiner

*Primary Examiner* — Zakaria Elahmadi
(74) *Attorney, Agent, or Firm* — Woodard, Emhardt, Henry, Reeves & Wagner, LLP (57) ABSTRACT

A device and method for allowing a powertrain gear in an off-road vehicle to be changed to a second powertrain gear having a different number of drive teeth without changing the number of reluctor teeth, by replacing the first powertrain gear with a second powertrain gear having a different number of drive teeth but the same number of reluctor teeth.

18 Claims, 6 Drawing Sheets

RELUCTOR GEAR ASSEMBLY

FIELD OF THE INVENTION

The invention relates generally to motor vehicles, and more particularly to a reluctor gear assembly for use on high-performance off-road vehicles such as ATVs and UTVs.

BACKGROUND

A reluctor ring, also known as a tone ring or timing wheel, is typically provided on a vehicle crankshaft so that as the crankshaft rotates a sensor detects the passage of notches in the reluctor ring. The sensor reads the notches on the ring and this gives the ECU accurate crankshaft position, thus providing information to the electronic control module, which governs ignition timing, etc.

In conventional systems for off-road vehicles such as ATVs and UTVs, the reluctor teeth are typically part of the outer powertrain gear teeth. However, when a new powertrain gear is retrofit onto a machine, it is important to keep the number of sensed teeth the same as the original gear in order to avoid having to program or otherwise modify the factory computer and/or to keep the speedometer reading accurately.

A need therefore exists for an assembly and method for allowing a powertrain gear to be changed while maintaining the same reluctor gear, even when the new powertrain gear has a different number of teeth. This allows the powertrain gear to be changed without requiring the electronics to be changed. The present invention addresses that need.

SUMMARY OF THE INVENTION

The present invention provides a device and method for allowing a powertrain gear in an off-road vehicle to be changed to a second powertrain gear having a different number of drive teeth without changing the number of reluctor teeth. In one aspect the invention provides a powertrain gear assembly, comprising:
 a) a housing;
 b) a powertrain gear housed in the housing and adapted to drive an ATV or a UTV, the powertrain gear comprising:
  i) a gear body adapted to receive and rotate upon the rotation of a drive shaft;
  ii) a set of drive teeth that rotates with the gear body and is effective to transfer power upon rotation of the gear body;
  iii) a set of reluctor teeth that rotates with the gear body and is adapted to cooperate with a sensor to provide a signal indicating the rotation of the reluctor teeth, wherein the set of reluctor teeth is different from the set of drive teeth; and
 c) a sensor effective for sensing the rotational movement of the set of reluctor teeth.

In some embodiments the number of reluctor teeth is different than the number of drive teeth.

In some embodiments the sensor senses the rotational movement of the set of reluctor teeth by detecting the speed at which reluctor teeth pass by a sensor location. Preferably, the sensor does not detect the rotational movement of the set of drive teeth.

In some embodiments the reluctor teeth are cut into the gear body. In other embodiments the reluctor teeth are provided on a ring that is removably mounted to the gear body.

Similarly, the drive teeth may be cut into the gear body, or may be provided on a ring that is removably mounted to the gear body.

In another aspect of the present invention there is provided a method for allowing the first powertrain gear to be changed to a second powertrain gear having a different number of drive teeth without changing the number of reluctor teeth. As with the assembly noted above, this method is useful in an off-road vehicle having a powertrain gear with a set of drive teeth for driving the vehicle, and a set of reluctor teeth for providing crankshaft position information to an electronic control module. The method preferably comprises replacing the first powertrain gear with a second powertrain gear, wherein the number of drive teeth provided on the first powertrain gear is different from the number of teeth provided on the second powertrain gear, but the number of reluctor teeth provided on the first powertrain gear is the same as the number of reluctor teeth provided on the second powertrain gear.

In another embodiment the method comprises:
 a) providing the vehicle with the first powertrain gear, wherein the first powertrain gear comprises:
  i) a central opening adapted to receive a drive shaft of the vehicle;
  ii) a gear body extending radially from the central opening and terminating in a round outer circumference;
  iii) a set of drive gear teeth formed in the round outer circumference;
  iv) a set of reluctor teeth formed in the powertrain gear in a location separate from the set of drive teeth; and
 b) replacing the first powertrain gear with a second powertrain gear, wherein the second powertrain gear comprises:
  i) a central opening adapted to receive a drive shaft of the vehicle;
  ii) a gear body extending radially from the central opening and terminating in a round outer circumference;
  iii) a set of drive gear teeth formed in the round outer circumference;
  iv) a set of reluctor teeth formed in the powertrain gear in a location separate from the set of drive teeth;
 wherein the number of drive teeth provided on the first powertrain gear is different from the number of teeth provided on the second powertrain gear, but the number of reluctor teeth provided on the first powertrain gear is the same as the number of reluctor teeth provided on the second powertrain gear.

As with the assembly noted above, the method may used on a vehicle having a sensor effective for sensing the rotational movement of the set of reluctor teeth, and wherein the sensor senses the rotational movement of the set of reluctor teeth by detecting the speed at which reluctor teeth pass by a sensor location.

In another aspect of the present invention there is provided a powertrain gear for an off-road vehicle. The gear comprises:
 a) a central opening adapted to receive a drive shaft of the vehicle;
 b) a gear body extending radially from the central opening and terminating in a round outer circumference;
 c) a set of drive gear teeth formed in the round outer circumference;
 d) a set of reluctor teeth formed in the powertrain gear in a location separate from the set of drive teeth.

In some embodiments the gear body has an inner web portion and an outer ring portion, and wherein the outer ring portion has an outer ring circumference and an inner ring circumference. Accordingly, the set of drive teeth may be formed in the outer ring circumference of the outer ring portion, and the set of reluctor teeth may be formed in the inner ring circumference of the outer ring portion.

WRITTEN DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, with such alterations and modifications being contemplated as would normally occur to one skilled in the art to which the invention relates.

As previously indicated, one aspect of the present invention provides a method for allowing a powertrain gear in an off-road vehicle to be changed to a second powertrain gear having a different number of drive teeth without changing the number of reluctor teeth. In one embodiment, the inventive method is accomplished by replacing the first powertrain gear with a second powertrain gear having a different number of drive teeth but the same number of reluctor teeth.

In another aspect the invention there is provided a powertrain gear assembly for an off-road vehicle, with the assembly being effective for allowing the powertrain gear in to be changed to a second powertrain gear having a different number of drive teeth without changing the number of reluctor teeth. In one embodiment that assembly comprises:

a) a housing;
b) a powertrain gear housed in the housing and adapted to drive an ATV or a UTV, the powertrain gear comprising:
  i) a gear body adapted to receive and rotate upon the rotation of a drive shaft;
  ii) a set of drive teeth that rotates with the gear body and is effective to transfer power upon rotation of the gear body;
  iii) a set of reluctor teeth that rotates with the gear body and is adapted to cooperate with a sensor to provide a signal indicating the rotation of the reluctor teeth, wherein the set of reluctor teeth is different from the set of drive teeth; and
c) a sensor effective for sensing the rotational movement of the set of reluctor teeth.

In some embodiments the sensor senses the rotational movement of the set of reluctor teeth by detecting the speed at which reluctor teeth pass by a sensor location. Preferably, the sensor does not detect the rotational movement of the set of drive teeth.

In some embodiments the reluctor teeth are cut into the gear body. In other embodiments the reluctor teeth are provided on a ring that is removably mounted to the gear body.

Similarly, the drive teeth may be cut into the gear body, or may be provided on a ring that is removably mounted to the gear body.

In another aspect of the present invention there is provided a method for allowing a first powertrain gear to be changed to a second powertrain gear having a different number of drive teeth without changing the number of reluctor teeth. As with the assembly noted above, this method is useful in an off-road vehicle having a powertrain gear with a set of drive teeth for driving the vehicle, and a set of reluctor teeth for providing crankshaft position information to an electronic control module. The method preferably comprises replacing the first powertrain gear with a second powertrain gear, wherein the number of drive teeth provided on the first powertrain gear is different from the number of teeth provided on the second powertrain gear, but the number of reluctor teeth provided on the first powertrain gear is the same as the number of reluctor teeth provided on the second powertrain gear.

In another embodiment the method comprises:
a) providing the vehicle with the first powertrain gear, wherein the first powertrain gear comprises:
  i) a central opening adapted to receive a drive shaft of the vehicle;
  ii) a gear body extending radially from the central opening and terminating in a round outer circumference;
  iii) a set of drive gear teeth formed in the round outer circumference;
  iv) a set of reluctor teeth formed in the powertrain gear in a location separate from the set of drive teeth; and
b) replacing the first powertrain gear with a second powertrain gear, wherein the second powertrain gear comprises:
  i) a central opening adapted to receive a drive shaft of the vehicle;
  ii) a gear body extending radially from the central opening and terminating in a round outer circumference;
  iii) a set of drive gear teeth formed in the round outer circumference;

iv) a set of reluctor teeth formed in the powertrain gear in a location separate from the set of drive teeth;

wherein the number of drive teeth provided on the first powertrain gear is different from the number of teeth provided on the second powertrain gear, but the number of reluctor teeth provided on the first powertrain gear is the same as the number of reluctor teeth provided on the second powertrain gear.

As with the assembly noted above, the method may be used on a vehicle having a sensor effective for sensing the rotational movement of the set of reluctor teeth, and wherein the sensor senses the rotational movement of the set of reluctor teeth by detecting the speed at which reluctor teeth pass by a sensor location.

In another aspect of the present invention there is provided a powertrain gear for an off-road vehicle. The gear comprises:
 a) a central opening adapted to receive a drive shaft of the vehicle;
 b) a gear body extending radially from the central opening and terminating in a round outer circumference;
 c) a set of drive gear teeth formed in the round outer circumference;
 d) a set of reluctor teeth formed in the powertrain gear in a location separate from the set of drive teeth.

In some embodiments the gear body has an inner web portion and an outer ring portion, and wherein the outer ring portion has an outer ring circumference and an inner ring circumference. Accordingly, the set of drive teeth may be formed in the outer ring circumference of the outer ring portion, and the set of reluctor teeth may be formed in the inner ring circumference of the outer ring portion. In certain preferred embodiments, the set of reluctor teeth/notches is cut into the inner ring circumference of the outer ring portion.

In order to best allow reluctor teeth to be provided on the inner ring circumference of the outer ring portion, it is preferred that the outer ring has a thickness that is greater than the thickness of the web portion of the gear body.

In an alternative embodiment, the reluctor teeth may be provided on a separate ring or other structure that may be attached to the gear body, preferably using bolts or some other connection structure that allows the reluctor teeth to be removed and provided on a different gear body.

Figure 1:
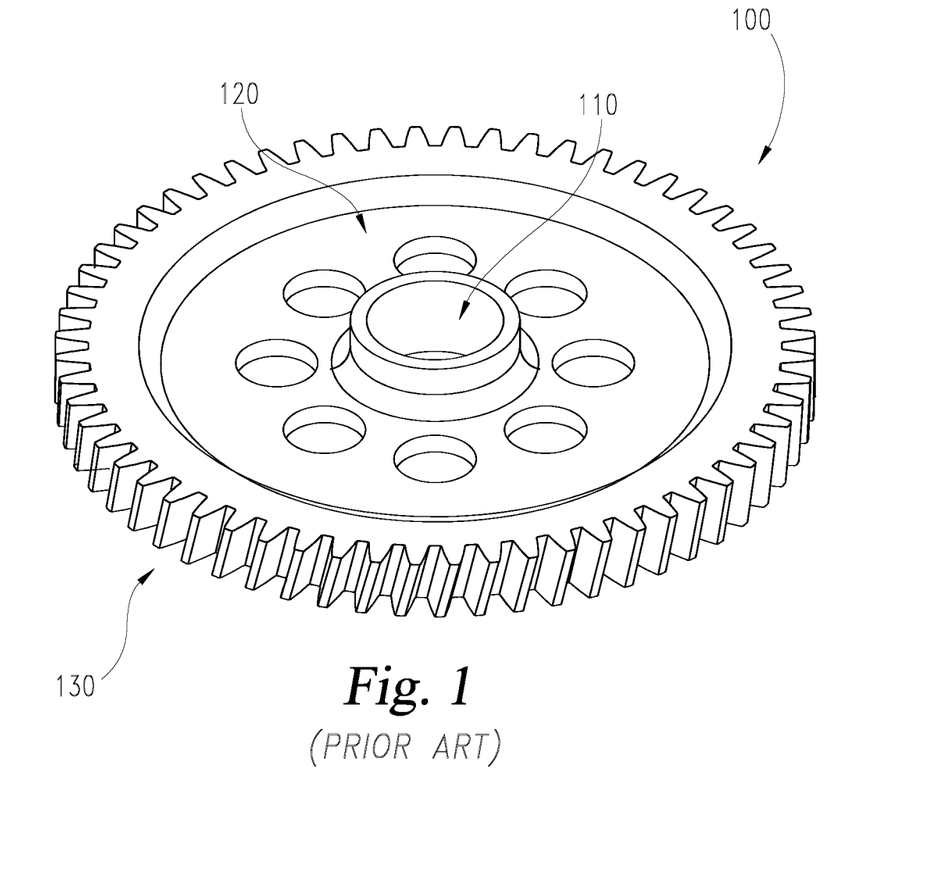
FIG. 1 shows a prior art gear in which the outer teeth serve as both the power gear teeth and the reluctor teeth.

Referring now to the drawings, FIG. 1 shows a prior art gear in which the outer teeth serve as both the power gear teeth and the reluctor teeth. Gear 100 comprises a central opening 110 and a gear body 120 extending outward from the central opening. Teeth 130 are provided in the outer circumference of gear body 120. It can be seen that teeth 130 serve both as the reluctor teeth and the drive teeth in this prior art assembly.

Figure 2:
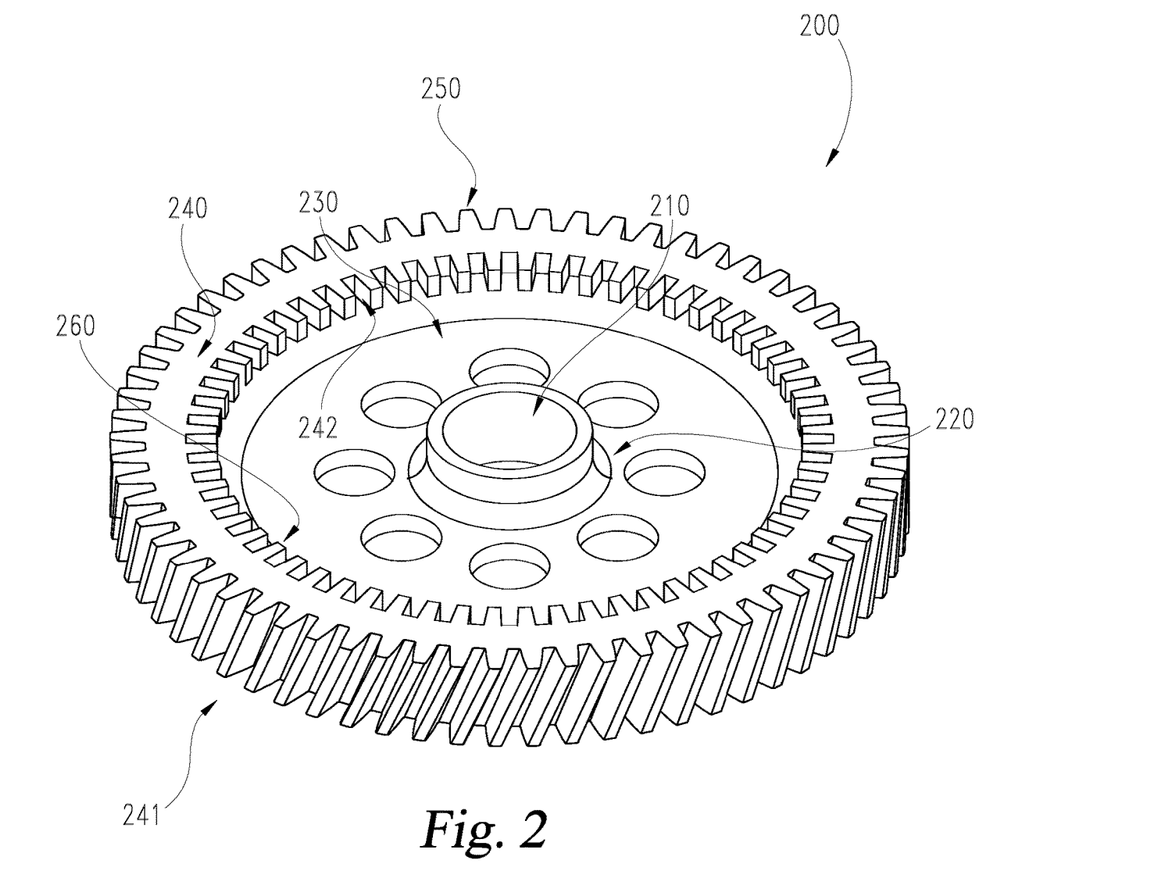
FIG. 2 shows one embodiment of the inventive reluctor gear, in which the gear comprises a central opening adapted to receive a drive shaft of the vehicle, a gear body extending radially from the central opening and having an inner web portion and an outer ring portion, with a set of drive teeth formed in the outer circumference of the ring, and a set of reluctor teeth formed in the inner circumference of the ring.

FIG. 2 shows one embodiment of the inventive reluctor gear, in which the gear comprises a central opening 210 adapted to receive a drive shaft of the vehicle, and a gear body 220 extending radially from the central opening. Gear body 220 has an inner web portion 230 and an outer ring portion 240. A set of drive teeth 250 is formed in the outer circumference 241 of the outer ring, and a set of reluctor teeth 260 formed in the inner circumference 242 of the outer ring. The set of reluctor teeth is provided so that the assembly can provide information to the electronic control module, which governs ignition timing, etc. As the crankshaft rotates, a sensor detects the passage of the reluctor gear teeth (or notches), and the passage of the teeth/notches on the ring gives the ECU accurate crankshaft position, thus providing information to the electronic control module, which governs ignition timing, etc.

In the illustrated embodiment the number of drive teeth is different from the number of reluctor teeth/notches. This is a preferred embodiment when changing the drive gear to a larger gear having a larger number of teeth. When that is done, it is desired to keep the number of sensed teeth the same as the original gear in order to avoid having to program or otherwise modify the factory computer and/or to keep the speedometer reading accurately.

Figure 3:
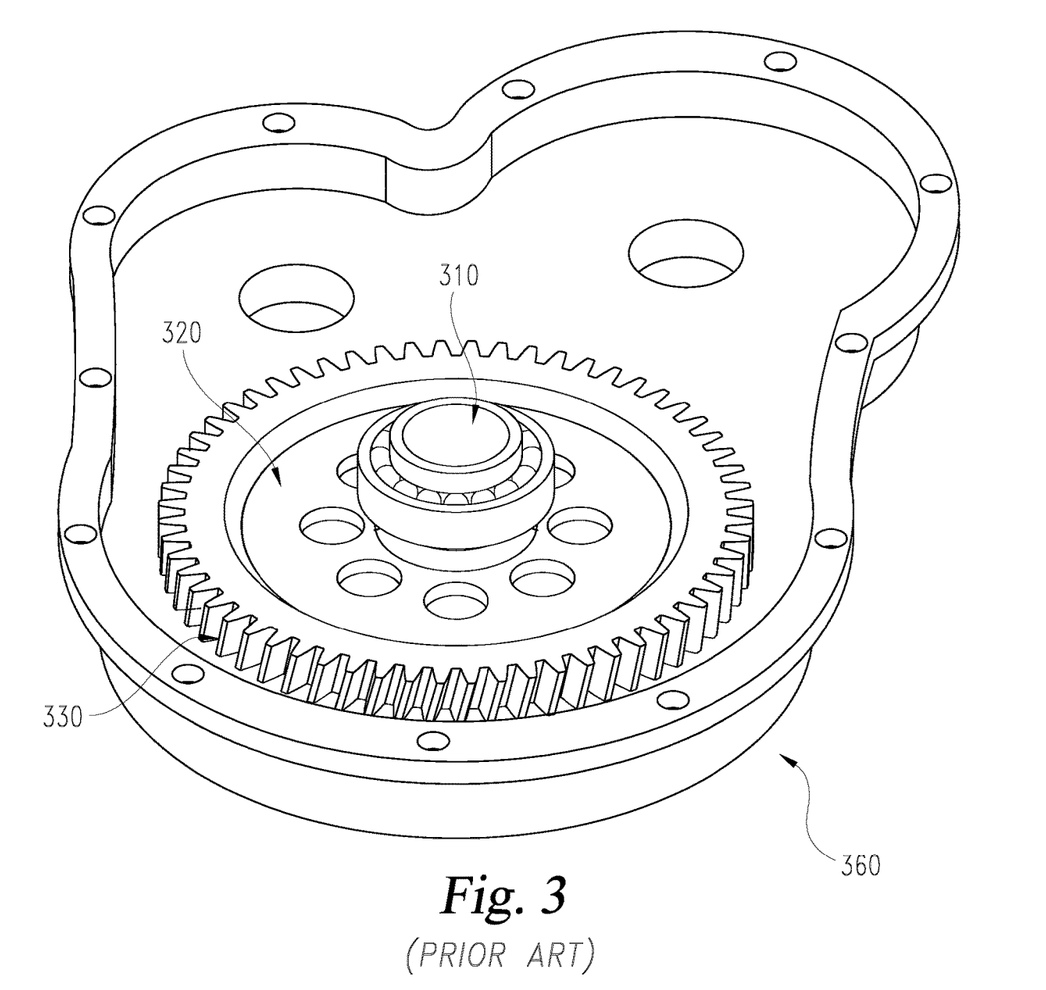
FIG. 3 shows a prior art powertrain gear assembly, comprising a housing and a powertrain gear housed in the housing and adapted to drive an ATV or a UTV.

FIG. 3 shows a prior art powertrain gear assembly, comprising a housing and a powertrain gear housed in the housing and adapted to drive an ATV or a UTV. The assembly includes a central opening 310 adapted to receive a drive shaft of the vehicle, and a gear body 320 extending radially from the central opening. A set of teeth 330 is provided on the outer circumference of gear body 320, and the assembly is housed in a housing 360.

Figure 4:
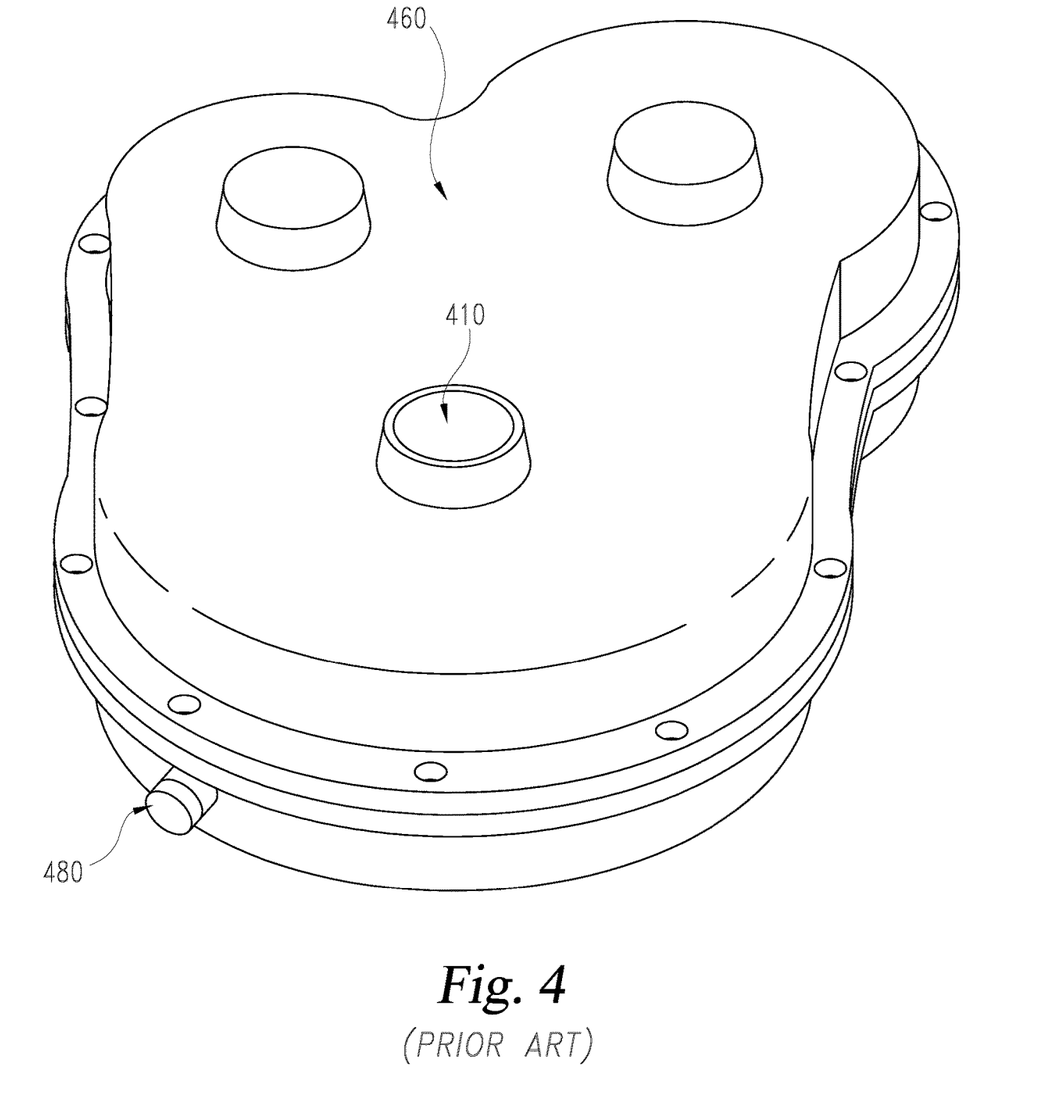
FIG. 4 shows another view of a prior art powertrain gear assembly, comprising a housing and a powertrain gear housed in the housing and adapted to drive an ATV or a UTV.

FIG. 4 shows another view of a prior art powertrain gear assembly, comprising a housing and a powertrain gear housed in the housing and adapted to drive an ATV or a UTV. The assembly includes a central opening 410 adapted to receive a drive shaft of the vehicle, and a housing 460 for protecting the assembly. A sensor 480 is provided to detect the rotational movement of the drive teeth, and to provide that information to the vehicle ECU.

Figure 5:
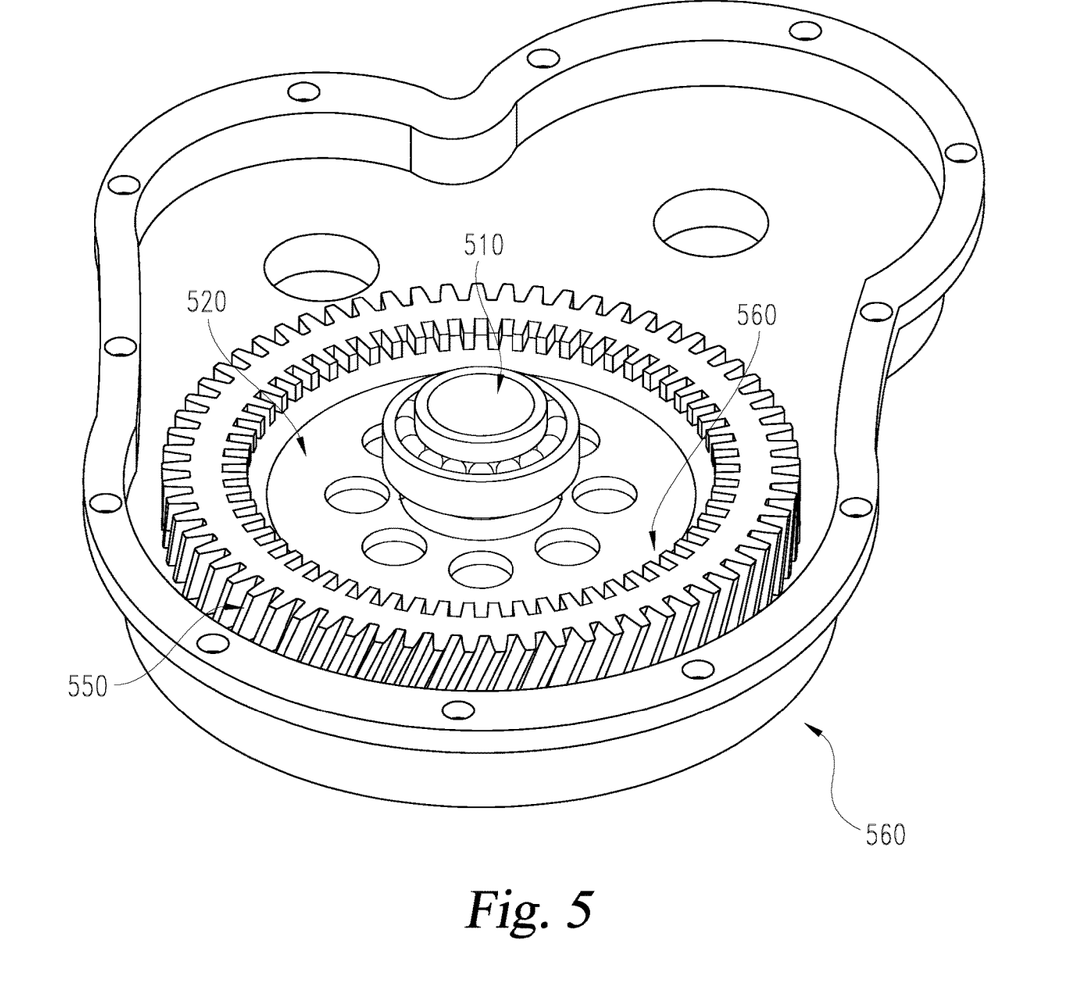
FIG. 5 shows one embodiment of the inventive powertrain gear assembly, in which the assembly comprises a housing, a powertrain gear housed in the housing and adapted to drive an ATV or a UTV, with the powertrain gear comprising a gear body adapted to receive and rotate upon the rotation of a drive shaft, a set of drive teeth that rotates with the gear body and is effective to transfer power upon rotation of the gear body, a set of reluctor teeth that rotates with the gear body and is adapted to cooperate with a sensor to provide a signal indicating the rotation of the reluctor teeth, with the set of reluctor teeth being different than the set of drive teeth, and a sensor effective for sensing the rotational movement of the set of reluctor teeth.

FIG. 5 shows one embodiment of the inventive powertrain gear assembly, in which the assembly comprises a housing 560, a powertrain gear housed in the housing and adapted to drive an ATV or a UTV, with the powertrain gear comprising a gear body 520 extending from a central opening 510 adapted to receive and rotate upon the rotation of a drive shaft. A set of drive teeth 550 extends from the gear body and is effective to transfer power upon rotation of the gear body. A set of reluctor teeth 560 rotates with the gear body and is adapted to cooperate with a sensor 580 to provide a signal indicating the rotation of the reluctor teeth. The set of reluctor teeth 560 is different than the set of drive teeth 550.

Figure 6:
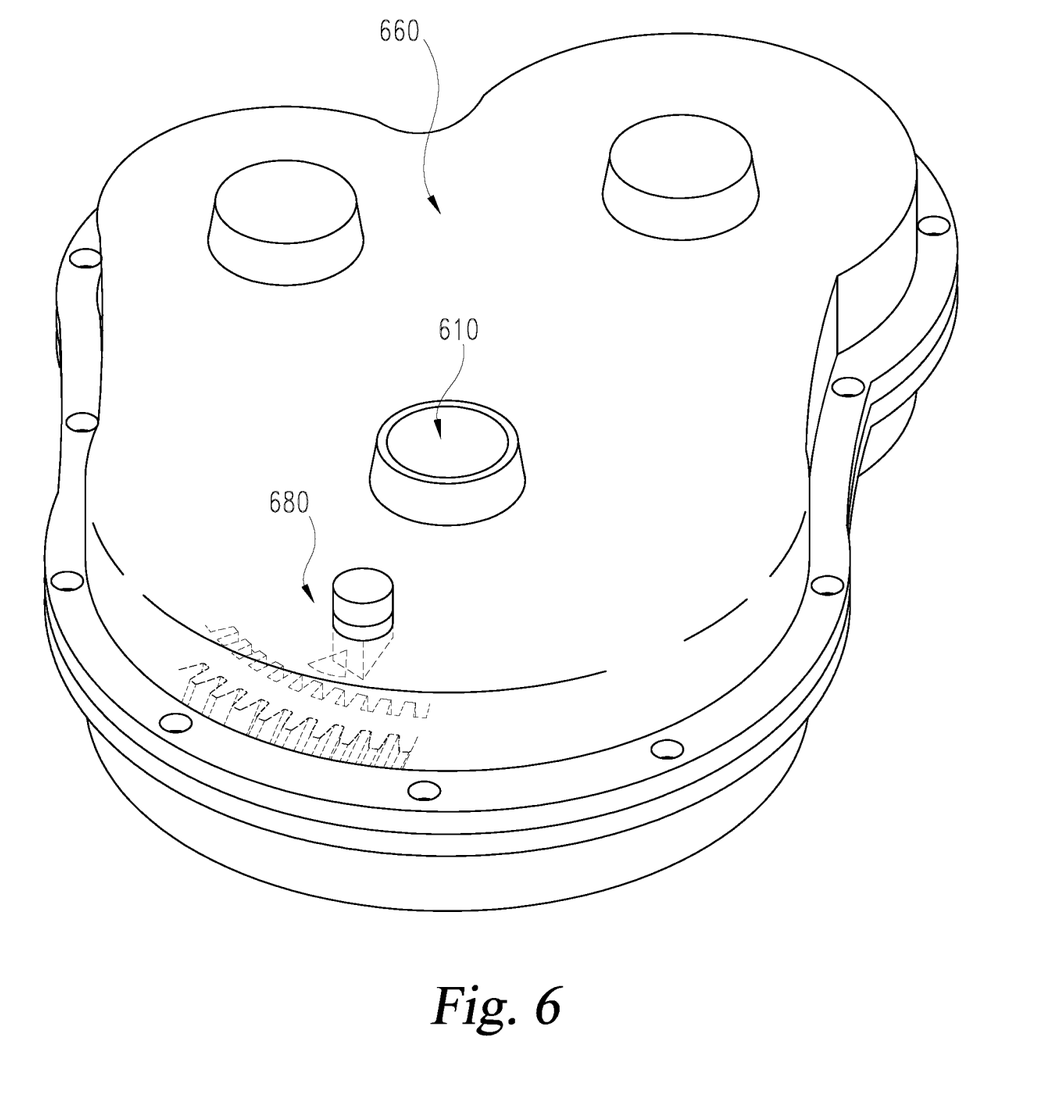
FIG. 6 shows another view of the inventive powertrain gear assembly of FIG. 5.

FIG. 6 shows another view of the inventive powertrain gear assembly of FIG. 5. Central opening 610 is adapted to receive a drive shaft, and is contained in transmission housing 660. The housing holds a drive gear having reluctor teeth cut into the inner side of the ring, and shown in FIG. 5 above. The reluctor teeth rotates with the gear body and are adapted to cooperate with sensor 680 to provide a signal indicating the rotation of the reluctor teeth.

Sensor 680 is effective for sensing the rotational movement of the set of reluctor teeth, and may be provided in any position that allows it to track the passage of reluctor teeth/notches. Preferably the sensor is positioned so that it does not also directly detect the passage of drive teeth, thus relying only on the passage of reluctor teeth/notches to provide crankshaft information to the ECU.

The present invention also provides a method for allowing a first powertrain gear to be changed to a second powertrain gear having a different number of drive teeth without changing the number of reluctor teeth. In that method a first powertrain gear is provided with a first number of drive teeth. To achieve desired performance improvement, the first powertrain gear is replaced by a second powertrain gear having a different number of drive teeth. To avoid needing to reprogram the vehicle's electronics, the second powertrain gear is a gear with a set of reluctor teeth that matches the set of reluctor teeth (which may also have been the drive teeth) of the first powertrain gear. A sensor is provided to sense the rotational movement of the set of reluctor teeth on the second powertrain gear, thus allowing it to track the passage of reluctor teeth/notches. This gives the ECU accurate crankshaft position even though the number of drive teeth has changed, thus providing accurate information to the electronic control module, which governs ignition timing, etc.

While the invention has been illustrated and described in the drawings and foregoing description, the same is to be considered as illustrative and not restrictive in character, it being understood that only certain preferred embodiments have been shown and described and that all changes and modifications that come within the spirit of the invention are desired to be protected. It is also to be appreciated that the present invention may comprise or consist essentially of any or all of the illustrated or described features, elements, and/or embodiments, and that any or all of the features, elements, and/or embodiments disclosed herein may be combined with any or all of the other features, elements, and/or embodiments disclosed herein to provide a system or method that comprises or consists essentially of such features, elements, and/or embodiments.

Further, the phrase A "and/or" B is used in this disclosure to mean A alone, or B alone, or both A and B.

The invention claimed is:

1. A powertrain gear assembly, comprising:
   a) a housing;
   b) a powertrain gear housed in the housing and adapted to drive an all-terrain vehicle (ATV) or a utility task vehicle (UTV), the powertrain gear comprising:
      i) a gear body that receives and rotates with rotation of a drive shaft;
      ii) a set of drive teeth that rotates with the gear body and transfers power upon rotation of the gear body;
      iii) a set of reluctor teeth that rotates with the gear body, wherein the set of reluctor teeth is different from the set of drive teeth, and wherein the reluctor teeth are integrally formed with the gear body; and
   c) a sensor that senses rotation of the set of reluctor teeth and provides a signal indicating the rotation of the reluctor teeth.

2. An assembly according to claim 1 wherein the number of reluctor teeth is different than the number of drive teeth.

3. An assembly according to claim 1 wherein the sensor senses the rotational movement of the set of reluctor teeth by detecting a speed at which reluctor teeth pass by a location of the sensor.

4. An assembly according to claim 1 wherein the sensor does not detect rotational movement of the set of drive teeth.

5. An assembly according to claim 1 wherein the drive teeth are integrally formed with the gear body.

6. An assembly according to claim 1 wherein the drive teeth are provided on a ring that is removably mounted to the gear body.

7. In an off-road vehicle having a first powertrain gear with a set of drive teeth for driving the vehicle and with a set of reluctor teeth for providing position information to an electronic control module, a method for allowing the first powertrain gear to be changed to a second powertrain gear having a different number of drive teeth without changing a number of reluctor teeth, the method comprising:
   replacing the first powertrain gear with a second powertrain gear,
   wherein a number of drive teeth provided on the first powertrain gear is different from a number of teeth drive provided on the second powertrain gear, and a number of reluctor teeth provided on the first powertrain gear is the same as a number of reluctor teeth provided on the second powertrain gear.

8. A method according to claim 7 wherein the method comprises:
   a) providing the vehicle with the first powertrain gear, wherein the first powertrain gear comprises:
      i) a first central opening adapted to receive a drive shaft of the vehicle;
      ii) a first gear body extending radially from the first central opening and terminating in a first round outer circumference;
      iii) a first set of drive gear teeth formed in the first round outer circumference;
      iv) a first set of reluctor teeth formed in the first powertrain gear; and
   b) wherein the second powertrain gear comprises:
      i) a second central opening adapted to receive the drive shaft of the vehicle;
      ii) a second gear body extending radially from the second central opening and terminating in a second round outer circumference;
      iii) a second set of drive gear teeth formed in the second round outer circumference;
      iv) a second set of reluctor teeth formed in the powertrain gear in a location separate from the second set of drive teeth.

9. A method according to claim 7 further comprising, detecting, with a sensor on the vehicle, rotational movement of the second set of reluctor teeth by detecting the speed at which the second reluctor teeth pass by a location of the sensor, and
   generating, based on the detected rotational movement of the second set of reluctor teeth, the position information.

10. A powertrain gear for an off-road vehicle, comprising:
    a) a central opening adapted to receive a drive shaft of the vehicle;
    b) a gear body extending radially from the central opening and terminating in a round outer circumference, wherein the gear body has an inner web portion and an outer ring portion, and wherein the outer ring portion has an outer ring circumference and an inner ring circumference;
    c) a set of drive gear teeth formed in the round outer circumference;
    d) a set of reluctor teeth formed in the powertrain gear in a location separate from the set of drive teeth.

11. An assembly according to claim 10 wherein the reluctor teeth are provided on a ring that is removably mounted to the gear body.

12. A powertrain gear according to claim 10 wherein the set of drive teeth is formed in the outer ring circumference of the outer ring portion, and the set of reluctor teeth is formed in the inner ring circumference of the outer ring portion.

13. A powertrain gear assembly comprising:
    a) a housing;
    b) a powertrain gear housed in the housing and adapted to drive an al-terrain vehicle (ATV) or a utility task vehicle (UTV, the powertrain gear comprising:
       i) a gear body that receives and rotates with rotation of a drive shaft;
       ii) a set of drive teeth that rotates with the gear body and transfers power upon rotation of the gear body;
       iii) a set of reluctor teeth that rotates with the gear body, wherein the set of reluctor teeth is different from the set of drive teeth; and c) a sensor that senses rotation of the set of reluctor teeth and provides a signal indicating the rotation of the reluctor teeth, wherein the sensor is aligned with the reluctor teeth.

14. A powertrain gear according to claim 13, wherein the sensor is positioned to not detect the drive teeth.

15. A powertrain gear according to claim 14, wherein the sensor is oriented perpendicular to the gear body.

16. A method according to claim 7, wherein the second powertrain gear has more drive teeth than the first powertrain gear.

17. A method according to claim 7, further comprising providing a sensor to sense the rotational movement of the set of reluctor teeth on the second powertrain gear.

18. A method according to claim 7, wherein the second powertrain gear has a larger outer diameter than the first powertrain gear.

\* \* \* \* \*

UNITED STATES PATENT AND TRADEMARK OFFICE
CERTIFICATE OF CORRECTION

PATENT NO. : 12,031,618 B2
APPLICATION NO. : 18/048050
DATED : July 9, 2024
INVENTOR(S) : Ken Thornton It is certified that error appears in the above-identified patent and that said Letters Patent is hereby corrected as shown below:

In the Claims

Column 8, Claim 13 b), Line 60 replace "(UTV," with --(UTV),--

Signed and Sealed this
Sixth Day of August, 2024

Katherine Kelly Vidal
*Director of the United States Patent and Trademark Office*